J. Peacock,

Barrel Cleaner,

No. 2,761. Reissued Sept. 3, 1867.

Witnesses

Ballou & Long

J. S. Peyton.

Inventor.

Jonathan Peacock.

United States Patent Office.

JONATHAN PEACOCK, OF ROCKFORD, ILLINOIS.

*Letters Patent No.* 53,177, *dated March* 13, 1866; *reissue No.* 2,761, *dated September* 3, 1867.

IMPROVEMENT IN BARREL-WASHING MACHINES.

The Schedule referred to in these Letters Patent and making part of the same.

TO ALL WHOM IT MAY CONCERN:

Be it known that I, JONATHAN PEACOCK, of Rockford, in the county of Winnebago, and State of Illinois, have invented a new and useful Improvement in Machinery for Washing Barrels, of which the following is a full, clear, and exact description, reference being had to the accompanying drawings, which make part of this specification, and in which—

My invention relates to a novel method of washing or cleaning barrels by machinery, and the improvement herein claimed consists, first, in so combining two or more revolving frames, in which the barrels are clamped while being washed, that each frame may be rotated independently of the others, or all may be rotated together, substantially as hereinafter shown; second, in so combining the clamping-frames that the barrels in each frame may be arranged at right angles to those in the other, whereby one frame counterbalances the other, as hereinafter shown; third, in a novel mode of combining the adjustable clamping-rails with the rotating heads; fourth, in so arranging the slots in which the clamping-rails are adjusted that those of one rail shall be radial to the axis of rotation of the frame, while the others are parallel to the radial slots, but tangential to the axis; fifth, in a novel method of constructing the water-trough, so as to equalize the flow to each barrel; sixth, in a novel method of constructing the water-trough, the supply-valve, and the filling pipes; seventh, in a novel device for lifting and holding up the filling pipes.

Figure 1:
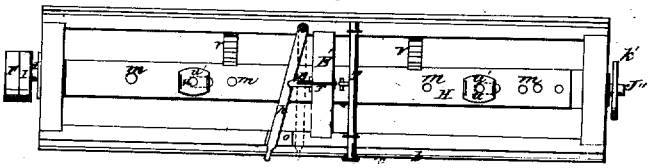
Figure 1 represents a plan or top view of my improved machine.
Figure 4:
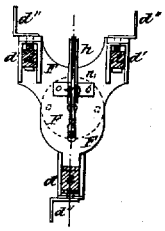
Figure 4 represents a vertical transverse section through the same at the line *x x* of fig. 2.
Figure 5:
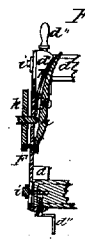
Figure 5 represents a similar section through one of the heads, showing the device for locking the two frames together.
Figure 2:
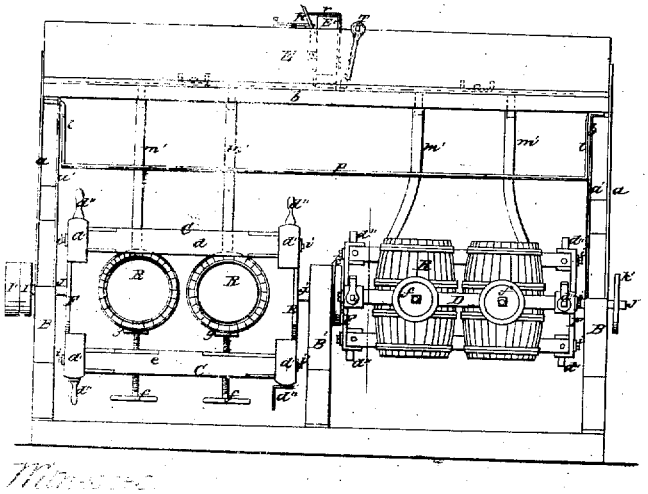
Figure 2 represents a view in elevation of one side of the same.
Figure 3:
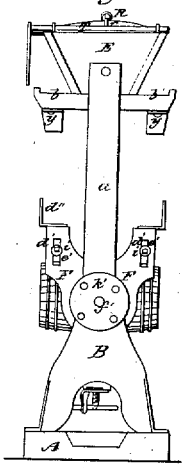
Figure 3 represents a similar view of one end of the same.

In the accompanying drawings the apparatus is shown as mounted in a stout frame, consisting of a base or platform A, having an upright or standard, B, at each end, and a shorter one, B′, in the middle. In this instance the upper portions of the standards B are shown as formed of metal plates or bars *a a′* supporting a trough, E. The outer plates *a* project above the bottom of the trough at each end, and are attached to it by screws, as shown in figs. 2 and 3, while the inner plates *a′* are bent horizontally at the top to form a support for the bottom of the trough, which is thus firmly supported, and yet can readily be detached from its frame. The bottom of the trough projects beyond its sides, so as to form ledges or shelves *b*. In this instance, the barrels to be washed are shown as mounted in two independent frames C D, revolving on axles J J′ mounted in suitable bearings in the frame pieces or standards B B′. The revolving frames consist of three rails *d e* arranged parallel to each other and to their axis of rotation. These clamping-rails slide to and from their axis of rotation in flanged guides *d*[1] mounted on heads F, which rotate on the journals J J′, and are adjusted in any desired position by means of slots *e′* in the heads F, and screw-bolts *i*. The rails are moved up and down by set-screws moved by handles *d*[2]. The flanges or guides of the rail *e*, it will be observed, radiate from the axis of rotation, while those of the rails *d* are tangential to it, and parallel to each other, by which means the rails, when moved in and out, always remain horizontal, and thus afford a flat surface on which to rest the barrels. The ends and sides of the rails are faced with metal to render them more durable. The barrels R are placed against the rails *d*, and held there by clamps *g* worked by a hand-wheel and screw, *f*, by which means barrels of different sizes can be accommodated. The frames are driven by power applied to a pulley, I, on the shaft J. A loose pulley, I′, is placed on the same shaft, upon which to slip the belt when the machine is to be stopped. As before remarked, the frames can rotate independently, but ordinarily they are locked together by means of a wheel, K, on the axle J′. This wheel is provided with holes, into which a pin on a lever, *h*, takes. (See figs. 4 and 5.) This lever is mounted on and revolves with the frame D, and has a spring to hold it in place. The object of this arrangement is to lock the frames together, or by releasing them to allow them to turn independently, or by releasing the catch and turning one frame one-fourth of a revolution and then locking it, its barrels will stand at a right angle to those of the other, and thus diminish the power required to drive it by causing one set of barrels to counterbalance the other. The trough E has holes in its bottom, from which hose or pipes *m′* lead to the bungs of the barrels. These pipes can be simultaneously withdrawn from the barrels by means of a lifter P, which consists of a rod or bar swinging on bent arms or cranks *l* underneath the trough. The pipes and lifter are held out of the way by spring-catches Y on the shelves *b*. The bottom of the trough is provided with a valve consisting, in this instance, of a plate, H, fitting snugly and sliding longitudinally on the bottom, being held down and guided by means of set-screws U′, which enter slots *u* in the plates. This plate H is provided with holes *m*, corresponding with those to which the pipes *m′* are attached. When the openings correspond the water escapes through the hose, but when they are closed the flow is stopped. A strip of rubber is also placed between the slide and trough to prevent leakage. The slide H is moved back and forth by a shifting-lever, T. A transverse partition, E′, divides the trough into two compartments, which, however, communicate, when desired, by means of a flap-valve, R, which is kept closed by a spring, *r*. The valve is opened by a lever, *p*, which acts on the handle or stem of a valve, which takes into a catch, *o*, to hold it open. By this means more water can be supplied to one set of barrels than the other, as will be hereinafter explained.

The quantity of water to be supplied to the barrels from each compartment of the trough is accurately measured by means of index or gauge-plates V.

The operation of the machine is as follows: The revolving frames are turned until the rails *d* are underneath. The barrels to be washed are then laid upon them with the bungs removed, and the bung-holes underneath. The rails *d e* should be adjusted by means of the hand-screw *d″*, so as to hold the barrels loosely. The barrels are now clamped tightly against the rails *d* by the hand-wheel, and screw *f*, and clamp *g*. The frames are now turned half round, so as to bring the bungs uppermost. The lifter P is then disengaged from its catch Y and the pipes *m′* lowered and inserted into the bung-holes. The desired quantity of water having been conducted into the trough the slide-valve H is moved, so as to open the communication between the trough and the hose, when the water flows into the barrels. When the barrels are full enough the valve is closed, and the lifter P turned up and fastened by its catch, thus lifting all the pipes out of the way at once. The bungs having been replaced one frame is turned until its barrels are at right angles to the other, so as to prevent all the water in them from rushing to the same side of the axis of rotation at the same time, which would require more power to drive the machine, and would also cause injurious jerks or shocks to the apparatus. The frames having been locked in this position by the catch-lever *h* are rotated by power applied to the driving-pulley I on the shaft J. The rotation of the barrels dashes the water in them about in all directions, and soon cleanses them. When sufficiently cleaned the bungs are removed and the bung-holes turned down; the water then escapes. The clamps *g* are loosened and the barrels removed.

It is obvious that different-sized barrels can be simultaneously arranged in the frames, and that the quantity of water supplied to the barrels can be gauged and regulated by the partition-valve and index. It is also evident that any number of frames may be connected for joint operation, or each one may be used independently of the other. A greater number of barrels can be used by increasing the length of the frames.

What I claim as my invention, is—

1. The combination, substantially as described, of the clamping-frames (arranged end to end) with the locking device, so that the barrels in each frame may be revolved independently of those in the others, or all may be revolved together.

2. The arrangement of the clamping-frames, as described, whereby the barrels in each frame are counterbalanced by those in the other.

3. The combination, in the manner described, of the adjustable clamping-rails with the rotating heads.

4. Arranging the slots in which the clamping-rails *d* are adjusted, parallel to each other and tangentially to the axis of rotation of the frames, as described.

5. The arrangement, as described, above the rotating clamping-frames, of the water-trough divided into compartments by the transverse partition provided with the valve which regulates the supply of water to one of the compartments, whereby I equalize the quantity of water admitted to each barrel.

6. The arrangement, as described, of the trough, the slide-valve in its bottom, and the filling pipes.

7. The combination, as described, with the water-trough and filling pipes, of the lifter, which simultaneously withdraws all the pipes from the barrels and holds them out of the way of the revolving barrels.

In testimony whereof I have hereunto subscribed my name.

JONATHAN PEACOCK.

Witnesses:

J. I. Peyton,

Baltis De Long.